(12) United States Patent
Yokoyama

(10) Patent No.: US 9,430,016 B2
(45) Date of Patent: Aug. 30, 2016

(54) INFORMATION PROCESSING APPARATUS CAPABLE OF SWITCHING PATTERNS TO BE COMPARED WITH DATA RECEIVED BY NETWORK INTERFACE CONTROL METHOD FOR INFORMATION PROCESSING APPARATUS, AND COMPUTER-READABLE STORAGE MEDIUM

(71) Applicant: CANON KABUSHIKI KAISHA, Tokyo (JP)

(72) Inventor: Junnosuke Yokoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 388 days.

(21) Appl. No.: 13/760,388

(22) Filed: Feb. 6, 2013

(65) Prior Publication Data

US 2013/0205153 A1 Aug. 8, 2013

(30) Foreign Application Priority Data

Feb. 8, 2012 (JP) ................................. 2012-024633

(51) Int. Cl.
*G06F 1/00* (2006.01)
*G06F 1/32* (2006.01)

(52) U.S. Cl.
CPC ........... *G06F 1/3203* (2013.01); *G06F 1/3275* (2013.01); *Y02B 60/1225* (2013.01); *Y02B 60/1228* (2013.01)

(58) Field of Classification Search
USPC ....... 713/322, 323, 320, 300, 324; 358/1.13, 358/1.14
See application file for complete search history.

(56) References Cited

U.S. PATENT DOCUMENTS

| | | | | |
|---|---|---|---|---|
| 2005/0188232 A1* | 8/2005 | Weng | .................... | G06F 1/3203 713/320 |
| 2007/0106916 A1* | 5/2007 | Yanagawa | ............. | G06F 1/3203 713/300 |
| 2009/0125739 A1* | 5/2009 | Satoh | ........................... | 713/322 |
| 2009/0210732 A1* | 8/2009 | Aoyagi | ............. | H04N 1/00885 713/320 |
| 2010/0128305 A1 | 5/2010 | Kawata et al. | | |
| 2010/0199116 A1* | 8/2010 | Qi | ........................... | G06F 1/325 713/324 |
| 2010/0290074 A1* | 11/2010 | Kuroishi et al. | ............. | 358/1.14 |
| 2011/0173473 A1* | 7/2011 | Cho | ............................. | 713/323 |
| 2011/0219249 A1* | 9/2011 | Kuwahara | ................. | G06F 1/00 713/323 |
| 2012/0105887 A1* | 5/2012 | Osaki | .......................... | 358/1.13 |

FOREIGN PATENT DOCUMENTS

| | | |
|---|---|---|
| CN | 101888461 A | 11/2010 |
| CN | 102263874 A | 11/2011 |
| JP | 2003-191570 A | 7/2003 |
| JP | 2010086068 A | 4/2010 |
| JP | 2010-283696 A | 12/2010 |
| JP | 2011-151806 A | 8/2011 |

* cited by examiner

*Primary Examiner* — Aurel Prifti
(74) *Attorney, Agent, or Firm* — Canon USA Inc. IP Division

(57) ABSTRACT

An information processing apparatus capable of operating in a first power state and a second power state different from the first power state includes a reception unit configured to receive data via a network from an external apparatus, a storage unit configured to store first pattern and second pattern that are to be compared with the data received by the reception unit, and a comparison unit configured to compare the data received by the reception unit with a pattern stored in the storage unit in a case where the information processing apparatus operates in the first power state, and to compare the data received by the reception unit with the second pattern stored in the storage unit in a case where the information processing apparatus operates in the second power state.

12 Claims, 10 Drawing Sheets

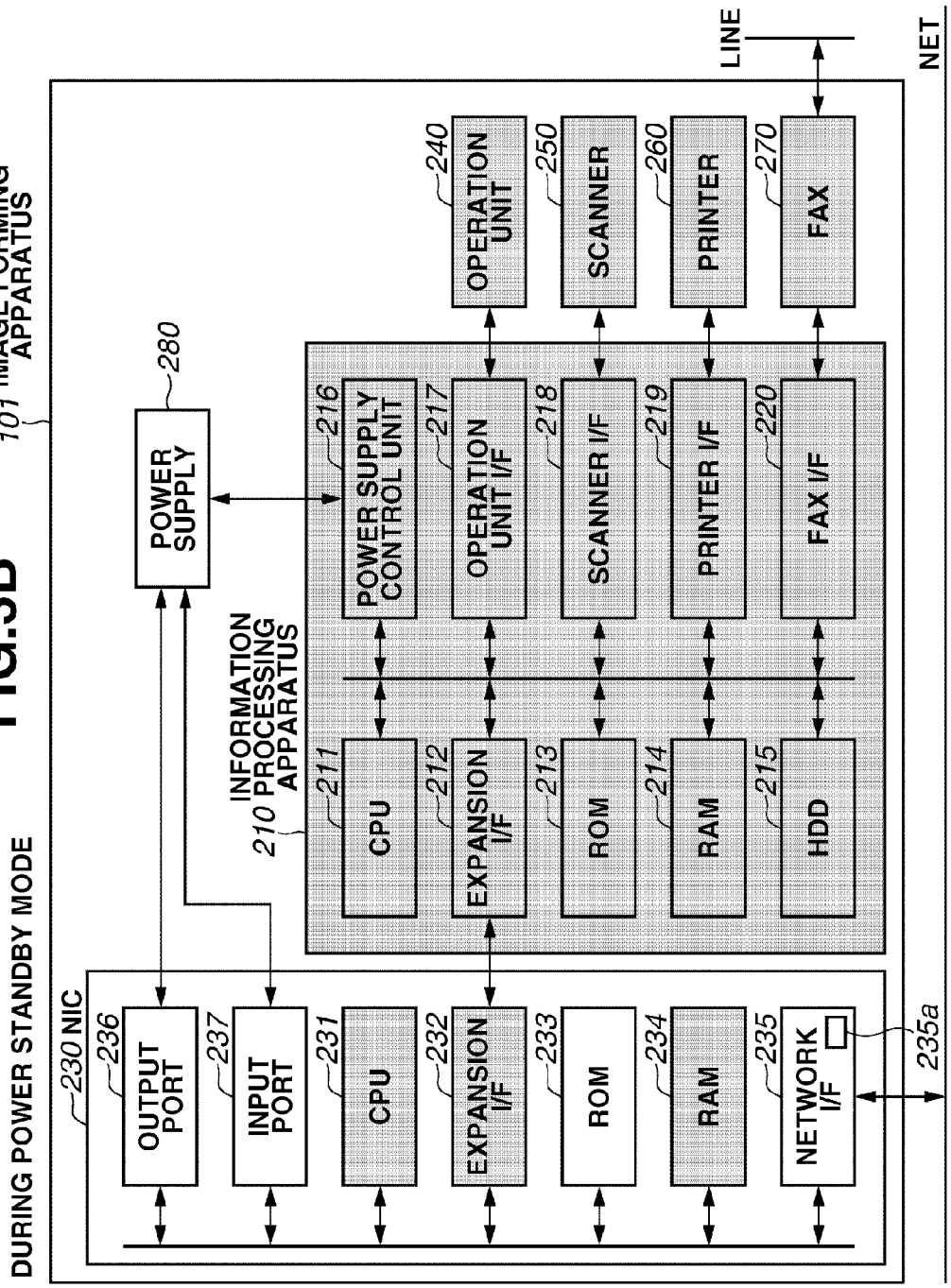

FIG.4

| | WAKE-UP PACKET | PROXY RESPONSE PACKET | POWER CONTROL PACKET | DISCARD PACKET |
|---|---|---|---|---|
| | APPLICATION PROCESSING REQUEST PACKET, ETC. | STATE CHECKING PACKET, ETC. | WOL PACKET, ETC. | |
| NORMAL POWER MODE | TRANSFER TO INFORMATION PROCESSING APPARATUS 210 | TRANSFER TO INFORMATION PROCESSING APPARATUS 210 | TRANSFER TO INFORMATION PROCESSING APPARATUS 210 | TRANSFER TO INFORMATION PROCESSING APPARATUS 210 |
| POWER-SAVING MODE | OUTPUT POWER WAKE-UP REQUEST SIGNAL FROM OUTPUT PORT 236 ACCUMULATE RECEIVED PACKETS IN NIC RAM 234 AND REPLY | GENERATE RESPONSE PACKET, AND RETURN RESPONSE PACKET TO TRANSMISSION SOURCE DEVICE 102 | DISCARD PACKET | DISCARD PACKET |
| POWER STANDBY MODE | DISCARD PACKET | DISCARD PACKET | OUTPUT POWER WAKE-UP REQUEST SIGNAL FROM OUTPUT PORT 236 | DISCARD PACKET |

OPERATIONS OF NIC 230 WHEN RECEIVING PACKET

FIG.5

| POWER MONITORING TERMINAL | POWER MODE DISCRIMINATION REGISTER | OPERATIONS OF NIC 230 | |
|---|---|---|---|
| H | * | NORMAL POWER MODE | ← 501 |
| L | H | POWER-SAVING MODE | ← 502 |
| L | L | POWER STANDBY MODE | ← 503 |

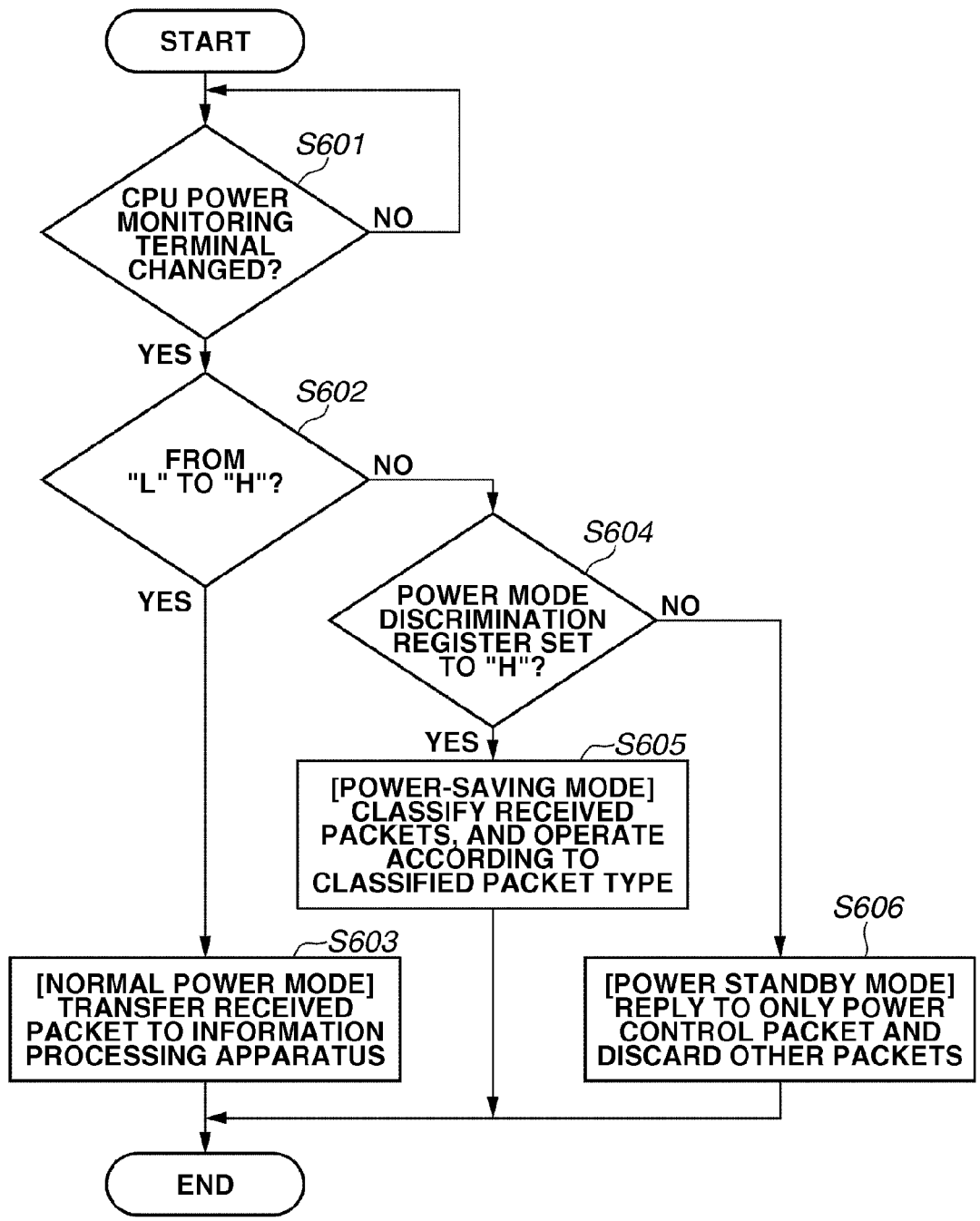

FIG.7

|  | PACKET CLASSIFICATION "A" | PACKET CLASSIFICATION "B" | PACKET CLASSIFICATION "C" |
|---|---|---|---|
|  | OPERATION FOR DISCARDING RECEIVED PACKET | PROXY RESPONSE OPERATION | INTERRUPT OUTPUT OPERATION |
| NORMAL POWER MODE | NON | NON | NON |
| POWER-SAVING MODE | POWER CONTROL PACKETS | PROXY RESPONSE PACKETS | WAKE-UP PACKETS |
| POWER STANDBY MODE | OTHER THAN POWER CONTROL PACKETS | NON | POWER CONTROL PACKETS |

FIG.9

| ADDRESS | CLASSIFICATION | CONTENT |
|---|---|---|
| 000~0FF | BOOT PORTION | BOOT PROGRAM |
| 100~1FF | POWER CONTROL PACKETS | ·WOL MAGIC PACKET<br>·POWER-ON REQUEST PACKET TO OWN MAC ADDRESS |
| 200~2FF | PROXY RESPONSE PACKETS | ·STATE CHECKING PACKET TO OWN IP ADDRESS |
| 300~3FF | WAKE-UP PACKETS | ·APPLICATION PROCESSING REQUEST PACKET TO OWN IP ADDRESS |

INFORMATION PROCESSING APPARATUS CAPABLE OF SWITCHING PATTERNS TO BE COMPARED WITH DATA RECEIVED BY NETWORK INTERFACE CONTROL METHOD FOR INFORMATION PROCESSING APPARATUS, AND COMPUTER-READABLE STORAGE MEDIUM

BACKGROUND OF THE INVENTION

1. Field of the Invention

The present invention relates to an information processing apparatus that performs communication with an external apparatus connected to a network, and a control method for the information processing apparatus.

2. Description of the Related Art

Conventionally, in information processing apparatuses such as image forming apparatuses, lower power consumption is required for various products, and there are devices having a power-saving mode in which power consumption during standby is reduced, in addition to a normal power mode in which normal application processing is performed.

In an image forming apparatus connectable to a network, there is installed a proxy response in which a power to parts other than a network interface card (NIC) is turned off, and a power to only the NIC is turned on during the power-saving mode, and the NIC returns responses to requests from other devices.

In an image forming apparatus discussed in Japanese Patent Application Laid-Open No. 2010-283696, the proxy response can be also returned with the apparatus remaining in the power-saving mode, even in communications of a connection type communication protocol on a Transmission Control Protocol (TCP) basis or a protocol for performing session establishment processing, in addition to a connectionless type communication protocol such as Simple Network Management Protocol (SNMP) or Address Resolution Protocol (ARP).

Such an image forming apparatus receives state checking packets and application processing request packets, from another device, such as a personal computer (PC), connected to the network. The state checking packet is a packet for checking if the image forming apparatus is responsive, which corresponds to, for example, state checking such as a name and an installation location of the image forming apparatus.

The image forming apparatus, upon receiving these state checking packets during the power-saving mode, performs proxy response in which only the NIC returns a response to the PC on behalf of the CPU as a main body, without causing the CPU as the main body to wake up, while keeping it turned off. A packet like the state checking packet will be hereinafter referred to as a "proxy response packet".

The application processing request packet is a packet for requesting the image forming apparatus to perform application processing, which corresponds to, for example, a print job to the image forming apparatus. The image forming apparatus, upon receiving these application processing request packets during the power-saving mode, causes the CPU as the main body to wake up to power-on state and performs application processing at the CPU as the main body. A packet for waking up the portion that has been turned off in the power-saving mode to power-on, when receiving a packet like the application processing request packet, and for setting the image forming apparatus to the normal power mode will be hereinafter referred to as a "wake-up packet".

On the other hand, in recent years, in order to further reduce power consumption of the image forming apparatus, power-off tends to be performed frequently, and it is being sought that power-on/off of the image forming apparatus can be performed even from a remote location.

For example, in order to reduce an electric power of an office, a case of turning off a power of specific image forming apparatuses or printers connected to the network, and restricting image forming apparatuses or printers that can be used is applicable. Alternatively, a case of turning off powers of all image forming apparatuses or printers on the network together is also applicable. The image forming apparatus or the printer that is instructed to power off will not be recognized from another device such as the PC on the network, and will not be displayed on a printer list.

A packet for performing power control of a device via the network from such remote location is referred to as a "power control packet". Since the NIC compatible with the above-described proxy response is not compatible with the power control from the remote location by the power control packet, the image forming apparatus cannot be powered on by the power control packet from the remote location.

SUMMARY OF THE INVENTION

The present invention is directed to an information processing apparatus capable of enabling power-on operation from a remote location by a power control packet, in addition to a proxy response operation during a power-saving mode.

According to an aspect of the present invention, an information processing apparatus capable of operating in a first power state and a second power state different from the first power state, a reception unit configured to receive data via a network from an external apparatus, a storage unit configured to store first pattern and second pattern that are to be compared with the data received by the reception unit, and a comparison unit configured to compare the data received by the reception unit with the first pattern stored in the storage unit in a case where the information processing apparatus operates in the first power state, and to compare the data received by the reception unit with the second pattern stored in the storage unit in a case where the information processing apparatus operates in the second power state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3B is a diagram illustrating energized areas within the image forming apparatus during a power standby mode.

FIG. 4 is a table illustrating operations of an NIC for each power mode and for each packet type.

FIG. 5 is a table illustrating an example of a determination table when the NIC switches between operations.

FIG. 6 is flowchart illustrating an example of processing when the NIC switches between operations in the first exemplary embodiment.

FIG. 7 is a table illustrating an example of a table indicating three operations of the NIC and corresponding packets

FIG. 9 is a table illustrating an example of address space of an NIC ROM.

DESCRIPTION OF THE EMBODIMENTS

Various exemplary embodiments, features, and aspects of the invention will be described in detail below with reference to the drawings.

Figure 1:
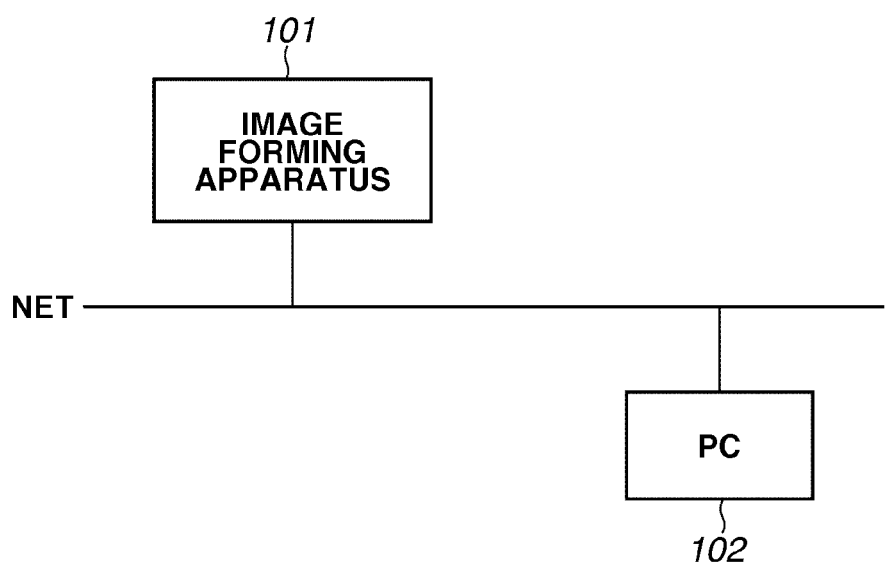
FIG. 1 is a diagram illustrating an example of an entire configuration of a network including an image forming apparatus according to a first exemplary embodiment of the present invention.

FIG. 1 illustrates an example of entire configuration of a network including an image forming apparatus according to a first exemplary embodiment of the present invention.

In FIG. 1, an image forming apparatus 101 serves as an information processing apparatus according to an exemplary embodiment of the present invention. The image forming apparatus 101 and a personal computer (PC) 102 are connected to each other via a network (NET), and are capable of communicating with each other.

Though not illustrated, a plurality of image forming apparatuses and PCs may be connected to one another.

Figure 2:
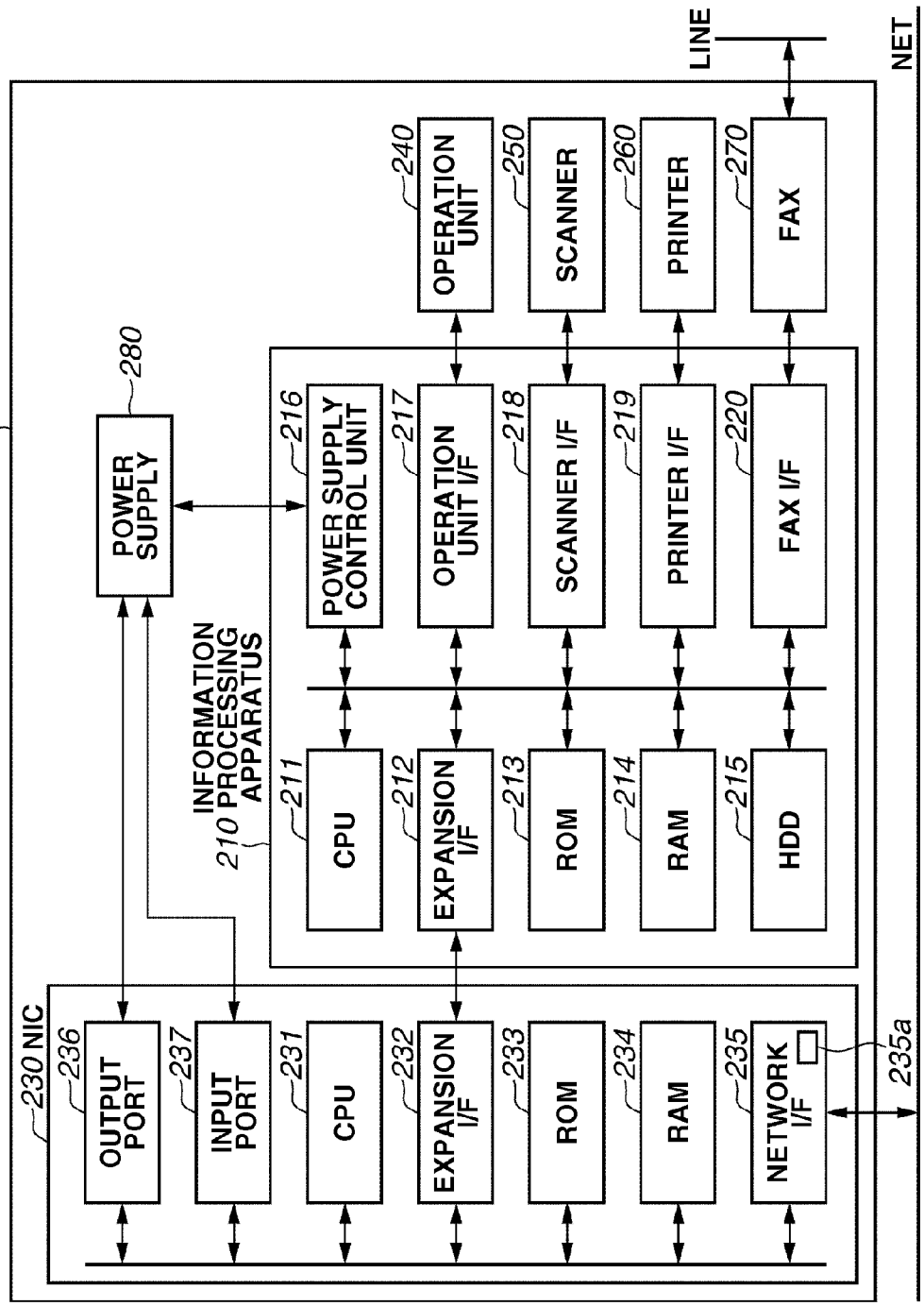
FIG. 2 is a block diagram illustrating an example of a configuration of the image forming apparatus.

FIG. 2 is a block diagram illustrating an example of a configuration of the image forming apparatus 101.

As illustrated in FIG. 2, the image forming apparatus 101 includes an information processing apparatus 210 and a network interface card (NIC) 230. The information processing apparatus 210 is connected to the network via the NIC 230.

A power supply 280 supplies power to respective portions of the image forming apparatus 101, including the information processing apparatus 210 and the NIC 230.

Hereinbelow, the information processing apparatus 210 will be described.

A central processing unit (CPU) 211 in the information processing apparatus 210 is a processing unit that executes software program of the information processing apparatus 210, and performs control of the entire apparatus. A random access memory (RAM) 214 is used for storage of temporary data, when the CPU 211 controls the apparatus, for example. A random access memory (ROM) 213 stores therein boot programs and fixed parameters of the apparatus. A hard disk drive (HDD) 215 is used for storage of various data.

An operation unit I/F (interface) 217 controls an operation unit 240 and displays various types of operation screens on a liquid crystal panel. Further, the operation unit I/F (interface) 217 transmits an instruction input via the operation screen to the CPU 211. A scanner I/F 218 controls a scanner 250, and reads an image of a document placed on a document positioning plate to generate image data. A printer I/F 219 controls a printer 260, and prints an image based on the image data on a recording medium. A facsimile (FAX) I/F 220 controls a FAX 270, performs transmission and reception of FAX data via a communication line, and processes images of the FAX data.

An expansion I/F 212 is connected to an expansion I/F 232 on the NIC 230 side, and controls data communication with the external apparatus (the PC 102) on the network (NET).

First, the NIC 230 will be described below.

A CPU 231 in the NIC 230 (hereinafter, an NIC CPU) executes a software program of the NIC 230, and performs control of the NIC 230. A RAM 234 in the NIC 230 (hereinafter, an NIC RAM) is used for storage of temporary data, when the NIC CPU 231 controls the apparatus. A ROM 233 in the NIC 230 (hereinafter, an NIC ROM) stores therein boot programs and fixed parameters of the NIC 230, for example.

An expansion I/F 232 in the NIC 230 (hereinafter, an NIC expansion I/F) controls data communication between the information processing apparatus 210 and the NIC 230.

A network I/F 235 establishes connection with the network (NET). The network I/F 235 has at least one bit of a power mode discrimination register 235a at an internal register. The details will be described in FIG. 5 and FIG. 6 described below.

An output port 236 is a terminal for outputting a power wake-up request signal to the power supply 280.

An input port 237 is a terminal (a CPU power monitoring terminal) for inputting from the power supply 280 a signal for monitoring the presence/absence of power supply from the power supply 280 to the CPU 211 in the information processing apparatus 210.

Hereinbelow, power modes of the image forming apparatus 101 will be described with reference to FIG. 3A and FIG. 3B.

The image forming apparatus 101 is an apparatus capable of operating by switching among at least a normal power mode (first power state), a power-saving mode (second power state) with smaller power consumption than that in the normal power mode, and a power standby mode (third power state) with even smaller power consumption than that in the power-saving mode.

Figure 3A:
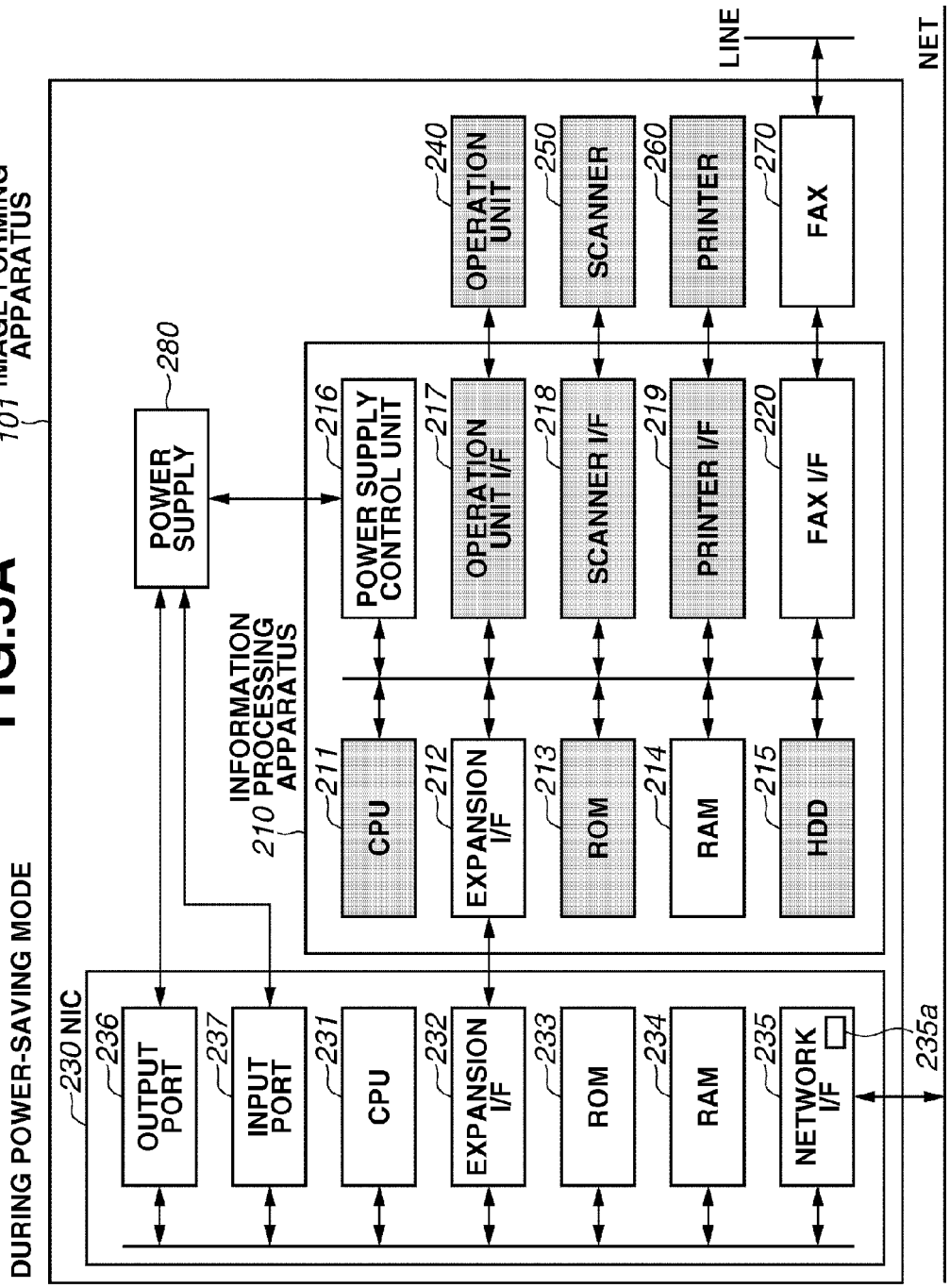
FIG. 3A is a diagram illustrating energized areas within the image forming apparatus during a power-saving mode.

FIG. 3A illustrates energized areas within the image forming apparatus 101 during the power-saving mode.

FIG. 3B illustrates energized areas within the image forming apparatus 101 during the power standby mode.

Shaded blocks in FIG. 3A and FIG. 3B indicate that energization is not performed there.

The figure illustrating energized areas within the image forming apparatus 101 during the normal power mode is omitted. During the normal power mode, energization is performed in all areas in the information processing apparatus 210, the NIC 230, the operation unit 240, the scanner 250, the printer 260, and the FAX 270, and the image forming apparatus 101 performs application processing requested from the user. Thus, packets received in the normal power mode can be processed by the information processing apparatus 210.

Hereinbelow, an operation of the image forming apparatus 101 during the power-saving mode will be described with reference to FIG. 3A.

As illustrated in FIG. 3A, during the power-saving mode, a power to a part of the information processing apparatus 210, the operation unit 240, the scanner 250, and the printer 260 is turned off, and power is supplied to only the NIC 230 and the FAX 270. In the information processing apparatus 210 during the power-saving mode, power is supplied only to the power supply control unit 216, the expansion I/F 212, the RAM 214, and the FAX I/F 220.

Since the entire NIC 230 is energized even during the power-saving mode, the image forming apparatus 101 can respond to a print request from the PC 102 connected to the network. In the NIC 230, upon receiving an application processing request packet or the like from the network I/F 235, the NIC CPU 231 outputs a power wake-up request signal to the power supply 280 from the output port 236. In response to the notification, the power supply 280 performs energization to the areas to which power is turned off, and the image forming apparatus 101 returns to the normal power mode, and processes the above-described received packet. It may be configured such that a notification in the case of receiving the application processing request packet or the like (a wake-up packet described below) is performed to the power supply control unit 216 via the expansion I/Fs 232 and 212. In the case of such a configuration, the power supply control unit 216 having received the notification performs energization to the areas to which power is turned off, and controls the image forming apparatus 101 to return to the normal power mode.

Further, since the FAX 270 and the FAX I/F 220 within the information processing apparatus 210 are energized even during the power-saving mode, FAX reception or the like from a line can be received. The FAX 270, upon receiving the FAX reception, performs notification to the power supply control unit 216 via the FAX I/F 220. In response to the notification, the power supply control unit 216 performs energization to the areas to which power is turned off, and the image forming apparatus 101 returns to the normal power mode, and processes the above-described received FAX.

Furthermore, in order to assure an early return to the normal power mode from the power-saving mode, the RAM 214 within the information processing apparatus 210 is supplied with power even during the power-saving mode to allow the RAM 214 to perform a self-refresh operation.

Next, an operation of the image forming apparatus 101 during the power standby mode will be described with reference to FIG. 3B.

As illustrated in FIG. 3B, in the power standby mode, power to the entire information processing apparatus 210, the operation unit 240, the scanner 250, the printer 260, the FAX 270, and a portion of the NIC 230 is turned off, and power is supplied to only a portion of the NIC 230. In the power standby mode, unlike during the power-saving mode, power supply to the NIC CPU 231, the NIC RAM 234, and the NIC expansion I/F 232 inside the NIC 230 is turned off. At that time, the image forming apparatus 101 becomes "not connected to" the network from the PC 102 (domain name system (DNS) server), and a line connection of the FAX becomes shut off.

In the power standby mode, unlike during the power-saving mode, power supply to the RAM 214 in the information processing apparatus 210 is also turned off, to still further reduce power consumption.

During the power standby mode, the NIC 230 reacts only when receiving a power control packet with a predefined pattern, and outputs a power wake-up request signal to the power supply 280 from the output port 236, thereby causing the image forming apparatus 101 to shift to the normal power mode from the power standby mode. At that time, the network I/F 235 performs control to resume power supply to the NIC CPU 231, the NIC expansion I/F 232, and the RAM 234. In the case of returning to the normal power mode from the power standby mode, the information processing apparatus 210 performs a boot operation from the beginning, and as a result it takes more time than a case of returning to the normal power mode from the power-saving mode. The image forming apparatus 101 may be shifted from the power standby mode to the power-saving mode instead of to the normal power mode.

Further, power supply to the NIC 230 during the power standby mode may be supplied from AC, or power supply by a battery cell or a power line communications (PLC) may be used. As described above, power supply control inside the NIC 230 is performed by the network I/F 235. More specifically, the network I/F 235, in case of shifting to the power standby mode, performs control to shut off (power shutoff) power supply to the NIC CPU 231, the NIC expansion I/F 232, and the RAM 234. Further, the network I/F 235, in case of shifting to the normal power mode or the power-saving mode from the power standby mode, performs control to resume power supply to the NIC CPU 231, the NIC expansion I/F 232, and the RAM 234.

Hereinbelow, operations of the NIC 230 for each power mode and for each packet type will be described with reference to FIG. 4.

FIG. 4 is a table illustrating operations of the NIC 230 for each power mode and for each packet type.

<A Case Where the Image Forming Apparatus 101 is in the Normal Power Mode>

As illustrated in the row "NORMAL POWER MODE" in FIG. 4, in a case where the image forming apparatus 101 is in the normal power mode, the NIC 230 transmits all packets received by the network I/F 235 to the information processing apparatus 210 via the expansion I/Fs 232 and 212. The responses to the received packets are all performed by the information processing apparatus 210. However, the power control packet may be discarded by the NIC 230 and may not be transferred to the information processing apparatus 210. In a case where the power control packet is transferred to the information processing apparatus 210, the power control packet is discarded by the information processing apparatus 210.

<A Case Where the Image Forming Apparatus 101 is in the Power-Saving Mode>

As illustrated in the row "POWER-SAVING MODE" in FIG. 4, in a case where the image forming apparatus 101 is in the power-saving mode, the NIC CPU 231 in the NIC 230 classifies packets received by the network I/F 235 into four categories. The four categories include a first type packet "wake-up packet", a second type packet "proxy response packet", a third type packet "power control packet", and a fourth type packet "discard packet".

The "wake-up packet" refers to an application processing request packet such as, for example, a print job request to the image forming apparatus 101. The "proxy response packet" refers to a state checking packet such as, for example, name and installation location of the image forming apparatus 101. The "power control packet" refers to a packet for the purpose of performing power control by remote operation such as, for example, a magic packet generally called a Wake on LAN (WOL) packet. The "discard packet" refers to a packet to which there is no need to respond, such as a packet which is not a packet addressed to the own apparatus.

The packets of these four categories are packets having respective predefined patterns, and the patterns are stored in the NIC ROM 233 (for example, as illustrated in FIG. 9). The NIC CPU 231 classifies packets of four categories by comparing a match pattern stored in the NIC ROM 233 with the received packet to determine whether they coincide with each other, using the NIC RAM 234. At that time, what are necessary for comparison are only necessary regions rather than all regions in a packet. Therefore, it is only necessary that patterns of necessary regions are stored in the NIC ROM 233. For example, proxy response packets in the case of the SNMP protocol can be classified based on only a portion of data in the packet, such as a MAC address portion in an Ethernet frame or an address port number portion in a User Datagram Protocol (UDP) frame or a request type portion in an SNMP frame.

In a case where the classified packet is a "wake-up packet", the NIC CPU 231 stores the received packet in the NIC RAM 234, and outputs a power wake-up request signal from the output port 236 to the power supply 280. In response to the power wake-up request signal, the power supply 280 resumes all powers in the image forming apparatus 101. The CPU 211 in the information processing apparatus 210, in which power supply has been resumed, resumes a state of software present before shifting to the power-saving mode, which has been retained in the RAM 214. Next, the information processing apparatus 210 performs analysis processing on packets retained in the NIC RAM 234, via the expansion I/Fs 212 and 232, and executes application operations corresponding to the received packets.

In a case where the classified packet is a "proxy response packet", the NIC CPU 231 generates a response packet, using the NIC RAM 234, and returns the proxy response packet to the transmission source device from the network I/F 235.

In a case where the classified packet is a "power control packet", the NIC CPU 231 discards the packet, and does not perform other operations. Also, in a case where the classified packet is a "discard packet", the NIC CPU 231 discards the packet, and does not perform other operations.

<A Case Where the Image Forming Apparatus 101 is in the Power Standby Mode>

As illustrated in the column "POWER STANDBY MODE" in FIG. 4, in a case where the image forming apparatus 101 is in the power standby mode, the NIC 230 reacts to only power control packets among the packets received by the network I/F 235.

The network I/F 235 determines a power mode of the image forming apparatus 101 based on the input port 237 and a value of the power mode discrimination register 235a (The details will be described with reference to FIG. 5 and FIG. 6 as will be described below). In the case of the normal power mode or the power-saving mode, the network I/F 235 transmits the received packet to the CPU 231 without performing determination of the type described below regarding the received packet. On the other hand, in the case of the power standby mode, the network I/F 235 processes the received packet as follows.

The "power control packet" is a packet with a predefined pattern, and the pattern is stored in the NIC ROM 233. In the power standby mode, a hardware logic circuit within the network I/F 235 performs pattern matching between the power control packet within the NIC ROM 233 and the received packet. Only if pattern matching results in coincidence of the packets, the network I/F 235 in the NIC 230 performs control to output a power supply request signal to the power supply 280 from the output port 236. The power supply request signal controls the power supply 280 to supply all powers of the image forming apparatus 101. The CPU 211 in the information processing apparatus 210 to which power supply has been performed, performs boot from the ROM 213, and shifts the image forming apparatus 101 to the normal power mode.

In a case where the received packet is other than the "power control packet" during the power standby mode, the network I/F 235 discards the packet, and does not perform other operations.

FIG. 5 is a table illustrating an example of a determination table when the NIC 230 switches between operations. The determination table is stored in the NIC ROM 233.

FIG. 6 is a flowchart illustrating an example of processing when the NIC 230 switches between operations, in the first exemplary embodiment. Operations of the NIC 230 are executed by the hardware logic circuit within the network I/F 235 or the CPU 231. The NIC 230 is operated by the CPU 231 within the NIC 230 reading and executing a program stored in the NIC ROM 233. Further, it may be configured such that a sub-CPU is provided within the network I/F 235 in place of the hardware logic circuit within the network I/F 235, and the NIC 230 is operated by the sub-CPU reading and executing the program stored in the NIC ROM 233.

In step S601, the network I/F 235 in the NIC 230 monitors a state of the CPU power monitoring terminal (the input port 237), and detects a change of the power supply state to the CPU 211 in the information processing apparatus 210 dependent on whether a state of the CPU power monitoring terminal is changed.

The NIC 230, when the following two conditions apply, outputs a power wake-up request signal to turn on the power supply to the power supply 280 from the output port 236. The two conditions include (1) a case where the image forming apparatus 101 receives a "wake-up packet" during the power-saving mode, and (2) a case where the image forming apparatus 101 receives a "power control packet" during the power standby mode. In both cases, since power supply to the CPU 211 comes to the on-state from the off-state, the CPU power monitoring terminal will transition from low (L) level to high (H) level. If the network I/F 235 determines that a state of the CPU power monitoring terminal has changed from L level to H level, as a result of the above-described detection (YES in step S602), then in step S603, the network I/F 235 determines that the image forming apparatus 101 has shifted to the normal power mode (the row 501 in FIG. 5), and performs an operation of the normal power mode. If the network I/F 235 determines that the image forming apparatus 101 has shifted from the power standby mode to the normal power mode, the network I/F 235 performs control to resume power supply to the NIC CPU 231, the NIC expansion I/F 232, and the RAM 234. In the normal power mode, the CPU 231 in the NIC 230 operates to transfer all packets received from the network I/F 235 to the information processing apparatus 210. In the normal power mode, the network I/F 235 transmits all received packets to the CPU 231 in the NIC 230.

Conversely, when the image forming apparatus 101 shifts from the normal power mode to the power-saving mode or to the power standby mode, the CPU 211 in the information processing apparatus 210 is turned off, but the CPU 211 issues a request to the power supply control unit 216 for shutting off power supply to the CPU 211 itself, after executing the following processing. More specifically, when shifting to the power-saving mode, the CPU 211 sets up the RAM 214 to perform a self-refresh operation, and issues a power-off request after performing energization processing to the FAX 270. When shifting to the power standby mode, the CPU 211 performs processing to back up all temporarily saved data on the RAM 214 to the HDD 215, and issues a power-off request after performing power shutoff processing to the FAX 270. At that time, even in the case of shifting to any of the power-saving mode and the power standby mode, the CPU 211, before issuing a power-off request, performs setting of the power mode discrimination register 235a inside the network I/F 235 in the NIC 230 to "H" (first information indicating the power-saving mode) or to "L" (second information indicating the power standby mode). When power supply to the CPU 211 is turned off, the CPU power monitoring terminal of the NIC 230 will transition from H level to L level. If the network I/F 235 determines that a state of the CPU power monitoring terminal has changed from H level to L level (NO in step S602), then in step S604, the network I/F 235 checks a state of the power mode discrimination register 235a.

If the power mode discrimination register 235a is "H" (YES in step S604), the network I/F 235 determines that the image forming apparatus 101 has shifted to the power-saving mode (the row 502 in FIG. 5), and then in step S605, the image forming apparatus 101 performs an operation of the power-saving mode. In the power-saving mode, the CPU 231 in the NIC 230 determines types of the packets received from the network I/F 235, classifies them into four categories (in FIG. 4), and performs an operation corresponding to the classification. In the power-saving mode, the network I/F 235 transmits all packets to the CPU 231 in the NIC 230 without performing determination of types or the like of the received packets.

On the other hand, if the power mode discrimination register 235a is "L" (NO in step S604), the network I/F 235 determines that the image forming apparatus 101 has shifted to the power standby mode (the row 503 in FIG. 5), and then in step S606, the image forming apparatus 101 performs an operation of the power standby mode. In the power-saving mode, the network I/F 235 determines types of the received packets, reacts only to the power control packets and operates, and discards other packets. In the power standby mode, the CPU 231 in the NIC 230 is not supplied with power and stops operations.

The condition (first shift processing condition) under which the image forming apparatus 101 shifts from the normal power mode to the power-saving mode or the power standby mode includes a case where a predetermined time has elapsed after the apparatus has ended application execution and a case where a time of day preset by the user is reached. Further, the condition under which the image forming apparatus 101 shifts from the normal power mode or the power-saving mode to the power standby mode (second shift processing condition) includes a case where a power control packet of power-off request is received from a network and a case where a time of day preset by the user is reached.

Through the configuration described above, the NIC 230 according to the present exemplary embodiment can perform the following three operations (1) to (3).
(1) When a proxy response packet is received during the power-saving mode, response can be performed by only the NIC portion.
(2) When a wake-up packet is received during the power-saving mod, the CPU 211 as the main body can be woken up, and the received packet can be transferred to the CPU 211.
(3) When a power control packet is received during the power standby mode, the image forming apparatus can be started up. In other words, the image forming apparatus can be returned from the power standby mode by power control from a remote location.

In this way, the NIC 230 according to the present exemplary embodiment can appropriately switch between at least the above-described three operations (1) to (3) depending on the power status of the image forming apparatus 101. As a result, the NIC 230 can also perform an operation to power on the image forming apparatus from the power standby mode according to power control from a remote location, in addition to performing a proxy response operation during the power-saving mode. Accordingly, it becomes possible to frequently shift the image forming apparatus to the power standby mode in which power consumption of the image forming apparatus is reduced still further than is consumed in the conventional power-saving mode.

Therefore, the power consumption of the image forming apparatus can be reduced still further than ever before.

In a second exemplary embodiment, a method for not using the CPU power monitoring terminal which is used in the first exemplary embodiment will be described. That is, the NIC according to the second exemplary embodiment has a configuration excluding the input port 237 (the CPU power monitoring terminal) from the configuration in FIG. 2.

FIG. 7 illustrates an example of a table indicating three operations of the NIC 230 and corresponding packets. The table is stored in the NIC ROM 233.

The operations of the NIC 230 are classified into three operations. The three operations include "operation for discarding received packet", "proxy response operation", and "interrupt output operation". Hereinbelow, the three operations will be individually described.

"Operation for discarding received packet" is an operation for discarding the received packet in a case where the packet received by the network I/F 235 does not match a media access control (MAC) address or an assigned IP address of the image forming apparatus 101. Further, the power control packet is also discarded when the image forming apparatus 101 is in the power-saving mode, and all packets other than the power control packet are discarded when the image forming apparatus 101 is in the power standby mode.

The "proxy response operation" is an operation for generating a response packet and returning the response packet to the transmission source device from the network I/F 235, in a case where the proxy response packet is received while the image forming apparatus 101 is in the power-saving mode.

The "interrupt output operation" is an operation for outputting a power supply request signal from the output port 236 to the power supply control unit 216 in a case where the packet received by the network I/F 235 corresponds to the following two cases. The two cases include a case where a wake-up packet is received when the image forming apparatus 101 is in the power-saving mode, and a case where the image forming apparatus 101 receives a power control packet.

In a case where the image forming apparatus 101 is in the normal power mode, packet processing is not performed in the NIC 230, and the packet is transferred to the information processing apparatus 210 via the expansion I/Fs 232 and 212.

In the present exemplary embodiment, the CPU 211 performs setting to "H" for the power mode discrimination register 235a inside the network I/F 235 in the NIC 230, even in the normal power mode. In other words, when the power mode discrimination register 235a is "H", it indicates "the normal power mode" or "the power-saving mode", and when the power mode discrimination register 235a is "L", it indicates "the power standby mode".

Figure 8:
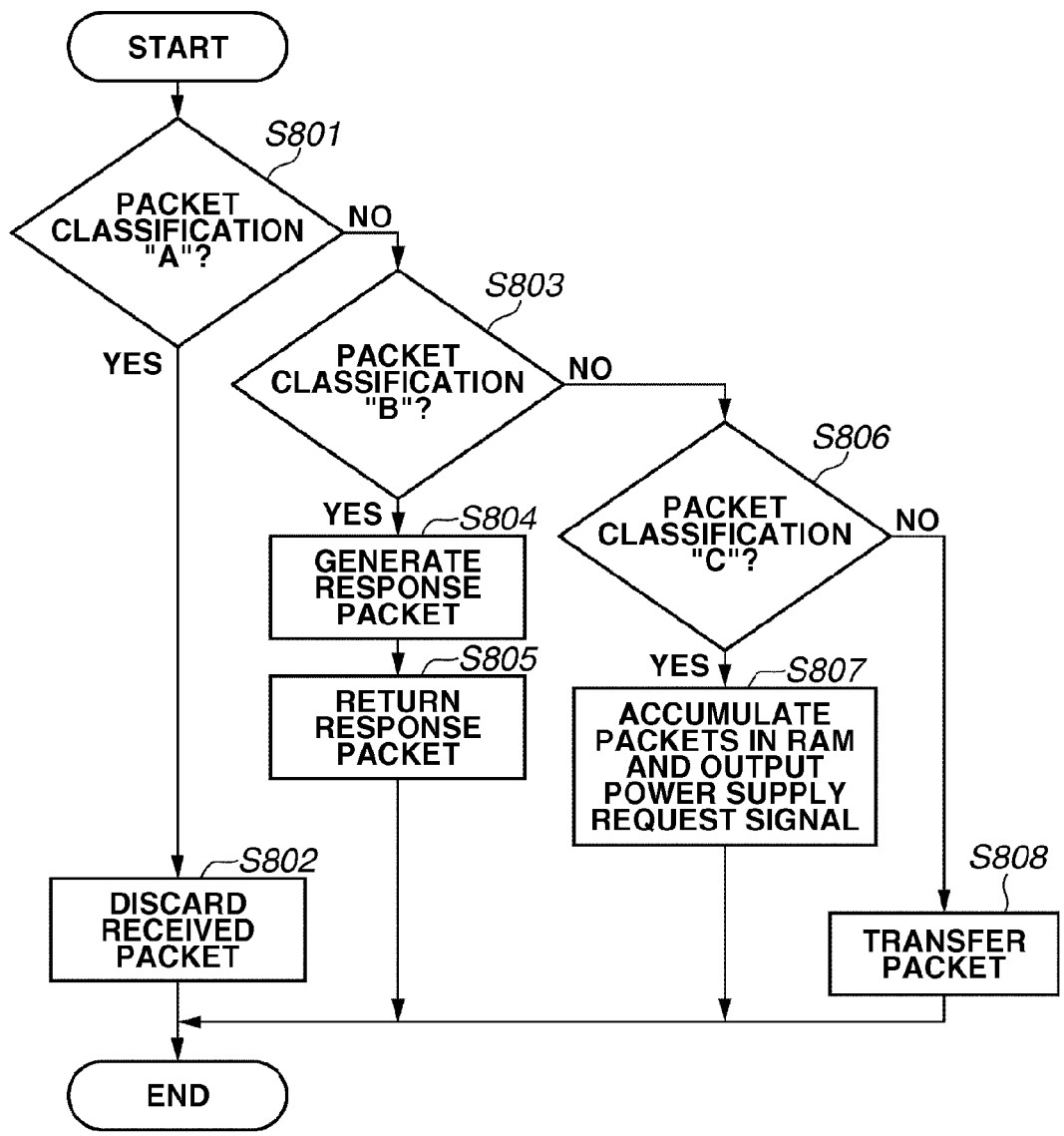
FIG. 8 is a flowchart illustrating an example of an operation of the NIC when a packet is received by a network interface (I/F) in a second exemplary embodiment.

FIG. 8 is a flowchart illustrating an example of operations of the NIC 230 when a packet is received by the network I/F 235, in the second exemplary embodiment. The operations of the NIC 230 are executed by a hardware logic circuit within the network I/F 235 or the CPU 231. The CPU 231 within the NIC 230 operates by reading and executing a program stored in the NIC ROM 233. Alternatively, it may be configured such that a sub-CPU is provided within the network I/F 235 in place of the hardware logic circuit within the network I/F 235, and the sub-CPU operates by reading and executing the program stored in the NIC ROM 233.

Operations in FIG. 8, unless otherwise specified, are performed by the NIC CPU 231 when the power mode discrimination register 235a is "H", and performed by the network I/F 235 when the power mode discrimination register 235s is "L".

First, in step S801, the NIC 230 determines whether the packet received by the network I/F 235 is a packet classification "A", which is a packet to be discarded.

Then, if it is determined that the received packet matches a predetermined pattern of the packet classification "A" (YES in step S801), then in step S802, the NIC 230 discards the received packet.

On the other hand, if it is determined that the received packet does not match the predetermined pattern of the packet classification "A" (NO in step S801), then in step S803, the NIC 230 determines whether the received packet is a packet for performing a proxy response operation of the packet classification "B".

Then, if it is determined that the received packet matches a predetermined pattern of the packet classification "B" (YES in step S803), then in step S804, the CPU 231 within the NIC 230 generates a response packet. In step S805, the CPU 231 within the NIC 230 returns the generated response packet via the network I/F 235.

On the other hand, if it is determined that the received packet does not match the predetermined pattern of the packet classification "B" (NO in step S803), then in step S806, the NIC 230 determines whether the received packet is a packet for performing an interrupt output operation of the packet classification "C".

Then, if it is determined that the received packet matches a predetermined pattern of the packet classification "C" (YES in step S806), then in step S807, the NIC 230 accumulates the received packet in the NIC RAM 234, and outputs a power supply request signal to the power supply control unit 216 from the output port 236.

On the other hand, if it is determined that the received packet does not match the predetermined pattern of the packet classification "C" (NO in step S806), then in step S808, the CPU 231 in the NIC 230 transfers the packet to the information processing apparatus 210 via the expansion I/Fs 232 and 212.

The types of packets corresponding to the packet classification "A", the packet classification "B", and the packet classification "C" vary depending on the power mode states of the image forming apparatus 101, but when the power modes are changed, the CPU 211 in the information processing apparatus 210 performs registration change to the NIC 230.

The NIC 230 has therein regions where the packet classification "A", the packet classification "B", and the packet classification "C" themselves are registered, and the CPU 211 may directly perform edition. Further, as illustrated in FIG. 9, address spaces of the NIC ROM 233 each are provided with storage areas where patterns of the power control packet, the proxy response packet, and the wake-up packet are stored. The CPU 211 in the information processing apparatus 210 may perform registration change to the NIC 230 when the power modes are changed, as to how the packet classification "A", the packet classification "B", and the packet classification "C" each correspond to which storage areas. The registration information is stored in, for example, a register of the network I/F 235.

FIG. 9 is a table illustrating an example of address spaces of the NIC ROM 233.

The NIC CPU 231 or the network I/F 235 determines a power state of the image forming apparatus 101, using information retained in the power mode discrimination register 235a, and can acquire packet patterns of the packet classification "A", the packet classification "B", and the packet classification "C", by switching between the storage areas corresponding to packet classifications when referring to the NIC ROM 233, based on the determined power state, and can perform classification of the received packets.

In a case where the image forming apparatus 101 is in the normal power mode, registration of the storage areas corresponding to the packet classification "A", the packet classification "B", and the packet classification "C" is not performed. In this case, however, the NIC 230 operates to transfer all packets received by the network I/F 235 to the information processing apparatus 210.

Through the configuration described above, the image forming apparatus according to the second exemplary embodiment has similar effects to those in the first exemplary embodiment, and can reduce power consumption of the image forming apparatus still further than ever before.

In the above-described exemplary embodiments, descriptions have been given taking an image forming apparatus as an information processing apparatus as an example, but another information processing apparatus may be used as long as the information processing apparatus is capable of performing network communication.

Structures and their contents of the above-described various types of data are not limited to those, and they are configured by various structures or contents depending on uses or purposes.

Hereinabove, exemplary embodiments have been described, but the present invention can be embodied as, for example, a system, an apparatus, a method, a program, or a storage medium. More specifically, the present invention may be applied to a system composed of a plurality of devices, or may be applied to an apparatus composed of a single device.

Further, configurations with a combination of the above-described exemplary embodiments are all included in the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-024633 filed Feb. 8, 2012, which is hereby incorporated by reference herein in its entirety.

What is claimed is:

1. An information processing apparatus comprising:
   a network interface;
   a control circuit connected to the network interface and configured to process data transmitted from the network interface;
   a memory configured to store data to be processed by the control circuit; and
   a power control circuit configured to:
      shift, in accordance with receiving an instruction to shift the information processing apparatus to a power saving mode, the information processing apparatus to the power saving mode in which power is supplied to the network interface and the memory and power is not supplied to the control circuit, and
      shift, in accordance with receiving an instruction to shift the information processing apparatus to a power off mode, the information processing apparatus to the power off mode in which power supply to the network interface is restricted and power is not supplied to the control circuit and the memory;
   wherein the network interface includes:
      a reception circuit configured to receive data via a network from an external apparatus;
      a storage circuit configured to store a first pattern and a second pattern that are to be compared with the data received by the reception circuit; and
      a comparison circuit configured to compare the data received by the reception circuit with the first pattern when the information processing apparatus operates in the power saving mode and to compare the data received by the reception circuit with the second pattern the information processing apparatus operates in the power off mode,
   wherein, based on reception of data corresponding to the first pattern having been performed by the reception circuit when the information processing apparatus is in the power saving mode, the power control circuit supplies power to the control circuit and control to which the power has been supplied resumes, using the data stored in the memory, the information processing apparatus from the power saving mode, and
   wherein, based on reception of data corresponding to the second pattern having been performed by the reception circuit when the information processing apparatus is in the power off mode, the power control circuit supplies power to the control circuit and the control circuit to which the power has been supplied boots, by executing a boot program stored in a boot ROM (read-only memory), the information processing apparatus from the power off mode.

2. The information processing apparatus according to claim 1, wherein the information processing apparatus operates in the power saving mode in which the information processing apparatus is able to transmit a response to the data received via the network from the external apparatus, and the power off mode in which the information processing apparatus is unable to transmit a response to the data.

3. The information processing apparatus according to claim 1, wherein data to which the network interface is able to respond in the power saving mode is a packet for acquiring a state of the information processing apparatus.

4. The information processing apparatus according to claim 3, wherein the power saving mode is a mode in which the information processing apparatus is able to process a specific packet for waking up the information processing apparatus and a mode in which the information processing apparatus is unable to process the packet for acquiring a state of the information processing apparatus.

5. The information processing apparatus according to claim 4, wherein the first pattern corresponds to the packet for acquiring a state of the formation processing apparatus, and the second pattern corresponds to the specific packet.

6. The information processing apparatus according to claim 1, further comprising an image forming circuit configured to form an image on a sheet, wherein,
   in a case where the reception circuit receives a print job for causing the image forming circuit to form an image in the power saving mode, power supply to the control circuit is started, and
   in a case where the reception circuit receives the print job in the power on mode, the print job is discarded.

7. A method for controlling an information processing apparatus which comprises: a network interface, a control circuit connected to the network interface and configured to process data transmitted from the network interface, a memory for storing data to be processed by the control circuit, and a power control for shifting the information processing apparatus to a power saving mode in which power is supplied to the network interface and the memory and power is not supplied to the control circuit in accordance with receiving an instruction to shift the information processing apparatus to the power saving mode, and shifting the information processing apparatus to a power off mode in which power supplied to the network interface is restricted and power is not supplied to the control circuit and the memory in accordance with receiving an instruction to shift the information processing apparatus to the power off mode, the method comprising:
   receiving data via a network from an external apparatus;
   storing a first pattern and a second pattern that are to be compared with the received data in a storage circuit;
   comparing the received data with the first pattern when the information processing apparatus operates in the power saving mode;
   comparing the received with the second pattern stored in the storage circuit in a case where the information processing apparatus operates in the power off mode;
   supplying power to the control circuit when the information processing apparatus is in the power off mode based on reception of data corresponding to the first pattern having been performed and resuming the information processing apparatus from the power saving mode using the data stored in the memory by the control circuit to which power has been supplied, and
   supplying power to the control circuit when the information processing apparatus is in the power off mode and resuming based on reception of data corresponding to the second pattern having been performed, and booting the information processing apparatus from the power off mode by executing a boot program stored in a boot ROM (read-only memory) using the control circuit to which the power has been supplied.

8. A non-transitory computer-readable storage medium storing a program that causes a computer to execute the method according to claim 7.

9. The method according to claim 7, wherein the information processing apparatus operates in the power saving mode in which the information processing apparatus is able to transmit a response to the data received via the network from the external apparatus, and the power off mode in which the information processing apparatus is unable to transmit a response to the data.

10. The method according to claim 7, wherein data to which the network interface is able to respond in the power saving mode is a packet for acquiring a state of the information processing apparatus.

11. The method according to claim 10, wherein the power saving mode is a mode in which the information processing apparatus is able to process a specific packet for waking up the information processing apparatus and a mode in which the information processing apparatus is unable to process the packet for acquiring a state of the information processing apparatus.

12. The method according to claim 11, wherein the first pattern corresponds to the packet for acquiring a state of the formation processing apparatus, and the second pattern corresponds to the specific packet.

\* \* \* \* \*